US011233438B2

United States Patent
Huang et al.

(10) Patent No.: US 11,233,438 B2
(45) Date of Patent: Jan. 25, 2022

(54) TERMINAL FRAME AND STATOR FRAME

(71) Applicant: Tyco Electronics (Shanghai) Co. Ltd., Shanghai (CN)

(72) Inventors: Yongjian Huang, Shanghai (CN); Tongbao Ding, Shanghai (CN); Sheng Li, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 112 days.

(21) Appl. No.: 16/109,919

(22) Filed: Aug. 23, 2018

(65) Prior Publication Data

US 2019/0068022 A1    Feb. 28, 2019

(30) Foreign Application Priority Data

Oct. 9, 2017 (CN) .......................... 201710929695.5

(51) Int. Cl.
*H02K 5/22* (2006.01)
*H02K 3/52* (2006.01)

(52) U.S. Cl.
CPC ............. *H02K 5/225* (2013.01); *H02K 3/522* (2013.01)

(58) Field of Classification Search
CPC .. H02K 3/50; H02K 3/32; H02K 3/38; H02K 3/521
USPC .......................................................... 310/71
See application file for complete search history.

(56) References Cited

U.S. PATENT DOCUMENTS

| 4,041,604 | A | | 8/1977 | Ackley |
| 4,147,398 | A | | 4/1979 | Lill |
| 4,177,397 | A | | 12/1979 | Lill |
| 4,181,393 | A | | 1/1980 | Lill |
| 4,267,404 | A | | 5/1981 | Rohde |
| 4,656,378 | A | | 4/1987 | Atherton et al. |
| 5,204,566 | A | | 4/1993 | Borgen et al. |
| 5,229,674 | A | * | 7/1993 | Best ....................... H02K 3/522 |
| | | | | 310/71 |
| 5,782,652 | A | | 7/1998 | Feher et al. |
| 6,010,362 | A | | 1/2000 | Caviness et al. |
| 2009/0189475 | A1 | * | 7/2009 | Shin ....................... H02K 3/522 |
| | | | | 310/195 |
| 2010/0327677 | A1 | * | 12/2010 | Iwai ..................... H01L 23/3107 |
| | | | | 310/64 |
| 2011/0037331 | A1 | * | 2/2011 | Jang ....................... H02K 3/522 |
| | | | | 310/71 |

FOREIGN PATENT DOCUMENTS

| JP | 60020755 | A | * | 2/1985 | ............. H02K 5/148 |
| JP | 61004431 | A | * | 1/1986 | ................ H02K 3/50 |
| JP | 61218339 | A | * | 9/1986 | ................ H02K 3/50 |

OTHER PUBLICATIONS

Takekoshi (JP 61004431 A) English Translation (Year: 1986).*
Fukunaga (JP 60020755 A) English Translation (Year: 1985).*
Takekoshi (JP 61218339 A) English Translation (Year: 1986).*

* cited by examiner

*Primary Examiner* — Tulsidas C Patel
*Assistant Examiner* — Robert E Mates
(74) *Attorney, Agent, or Firm* — Barley Snyder

(57) ABSTRACT

A terminal frame of a stator frame comprises a body adapted to receive a terminal. The body of the terminal frame is also adapted to be mounted to a coil frame of the stator frame in a detachable manner.

16 Claims, 6 Drawing Sheets

TERMINAL FRAME AND STATOR FRAME

CROSS-REFERENCE TO RELATED APPLICATIONS

This application claims the benefit of the filing date under 35 U.S.C. § 119(a)-(d) of Chinese Patent Application No. 201710929695.5, filed on Oct. 9, 2017, and Chinese Patent Application No. 201710733596.X, filed on Aug. 24, 2017.

FIELD OF THE INVENTION

The present invention relates to a motor and, more particularly, to a terminal frame and a stator frame for a motor.

BACKGROUND

A motor generally comprises a stator, a stator frame mounted in the stator, a coil wound on the stator frame, and a rotor mounted in the stator. When the coil is powered, an electromagnetic force is generated to drive the rotor to rotate. The stator frame is usually made of plastic, and the stator and the rotor are usually made of magnetic conductive material.

The stator frame generally comprises a coil frame for winding coils and a terminal frame for installing terminals. The stator frame is usually a single molded piece; the coil frame and the terminal frame are molded into a single component. In the process of manufacturing the motor, the stator frame is first pressed into the stator. Then, a wire, such as an enameled wire, is wound on the coil frame to form a coil. Lead ends of the coil are then pressed into wire slots formed in the terminal frame. Lastly, terminals are pressed into terminal chambers formed in the terminal frame to electrically connect the lead ends of the coil.

There are many different types of terminals, such as a MAGMATE type of terminal and a SIAMEZE type of terminal, and many different types of wires known in the art. In order to cooperate with different types of terminals and different types of wires, it is necessary to provide different types of terminal frames with different shapes or dimensions of terminal chambers and wire slots. Because the coil frame and the terminal frame of the stator frame is integrated together, the whole stator frame has to be replaced when it is necessary to replace different types of terminals or different types of wires. For example, if the terminal frame is damaged during the process of pressing the lead ends into the wire slots or pressing the terminals into the terminal chambers, the whole stator frame including the coil frame and the terminal frame must be replaced, which leads to serious waste and increased cost.

SUMMARY

A terminal frame of a stator frame comprises a body adapted to receive a terminal. The body of the terminal frame is also adapted to be mounted to a coil frame of the stator frame in a detachable manner.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
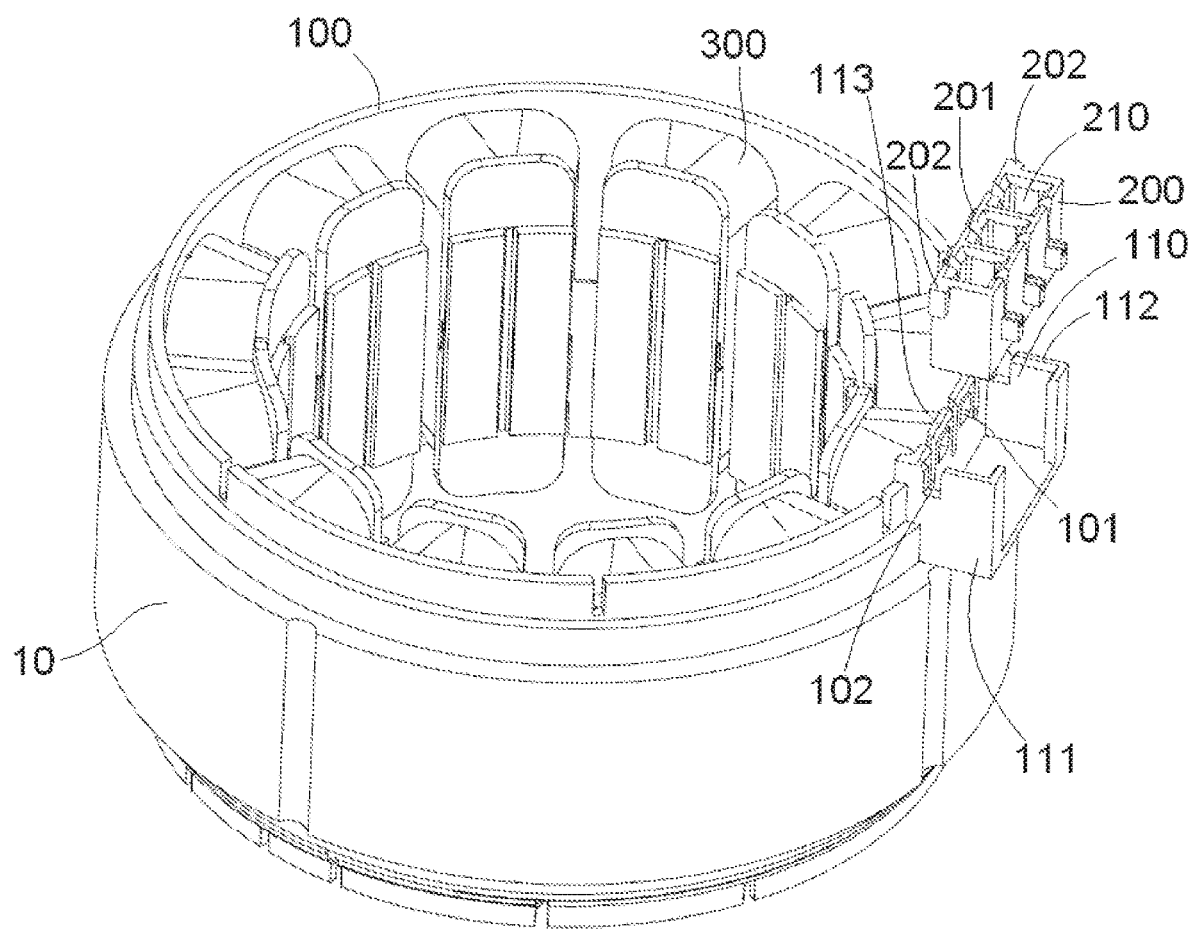
FIG. 1 is a perspective view of a stator frame according to an embodiment with a stator and a coil.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

Figure 2:
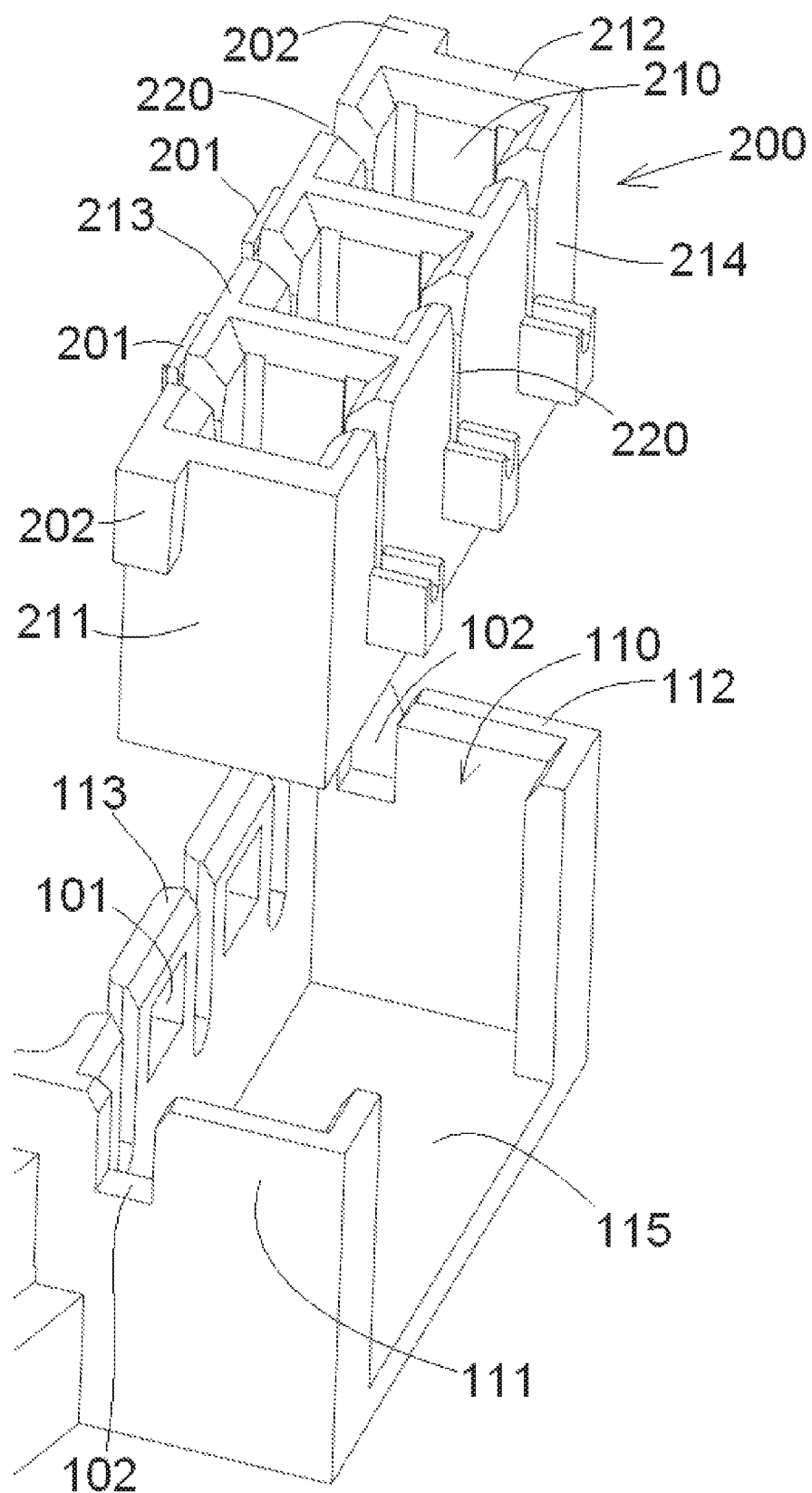
FIG. 2 is a perspective view of the stator frame of FIG. 1 with a terminal frame of the stator frame not mounted to a coil frame of the stator frame.
Figure 3:
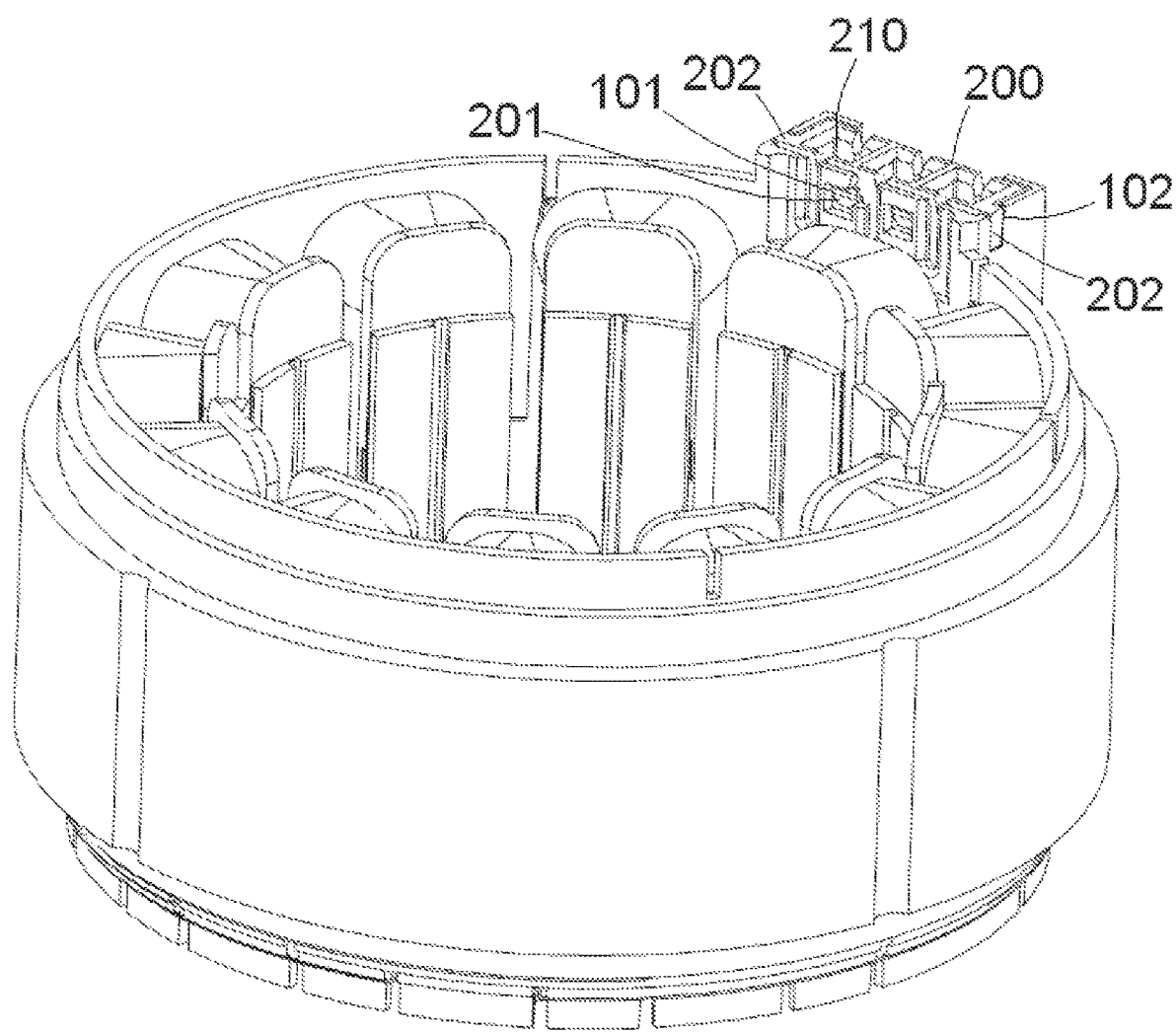
FIG. 3 is a perspective view of the stator frame of FIG. 1, the stator, and the coil with the terminal frame mounted in the coil frame.

A stator frame according to an embodiment of the invention is shown in FIGS. 1-3. The stator frame comprises a coil frame 100 and a terminal frame 200. A coil 300 is wound on the coil frame 100. A terminal is mounted in a terminal chamber 210 formed in the terminal frame 200. In the shown embodiment, the stator frame is mounted in a stator 10.

As shown in FIGS. 1-3, the terminal frame 200 is a component separated from the coil frame 100 and adapted to be mounted to the coil frame 100 in a detachable manner. An installation chamber 110 is formed on an outer side of the coil frame 100 and the terminal frame 200 is adapted to be installed and locked in the installation chamber 110 in a snap-fitting manner.

The installation chamber 110, as shown in FIGS. 1-3, includes a pair of end walls 111, 112, an inner side wall 113, an outer side wall 114, and a bottom wall 115. A slot 101 is formed in the inner side wall 113 of the installation chamber 110. The terminal frame 200 is adapted to be inserted into the installation chamber 110 through a top opening of the installation chamber 110.

The terminal frame 200, as shown in FIGS. 1-3, is a body including a pair of end walls 211, 212, an inner side wall 213, and an outer side wall 214. An elastic latch 201 is formed on the inner side wall 213 of the terminal frame 200. The elastic latch 201 of the terminal frame 200 is adapted to be locked into the slot 101 of the installation chamber 110, so as to lock the terminal frame 200 to the coil frame 100.

As shown in FIGS. 1-3, a wedge positioning slot 102 is formed in each end wall 111, 112 of the installation chamber 110. A wedge positioning block 202 is formed on each end wall 211, 212 of the terminal frame 200. The wedge positioning block 202 is adapted to be fit in the wedge positioning slot 102, so as to guide the terminal frame 200 to be correctly inserted into the installation chamber 110.

In the embodiment shown in FIGS. 1-3, a plurality of terminal chambers 210 are formed in the terminal frame 200, and a plurality of terminals are adapted to be mounted in the plurality of terminal chambers 210, respectively. As shown in FIG. 2, a plurality of wire slots 220 are formed in the inner side wall 213 and the outer side wall 214 of the terminal frame 200. Lead ends of coils 300 wound on the coil frame 100 are adapted to be pressed into and positioned in the wire slots 220, respectively. When the terminal is mounted in the terminal chamber 210, the terminal is brought into electrical contact with the lead end of the coil 300 and is electrically connected to the coil 300.

Figure 4:
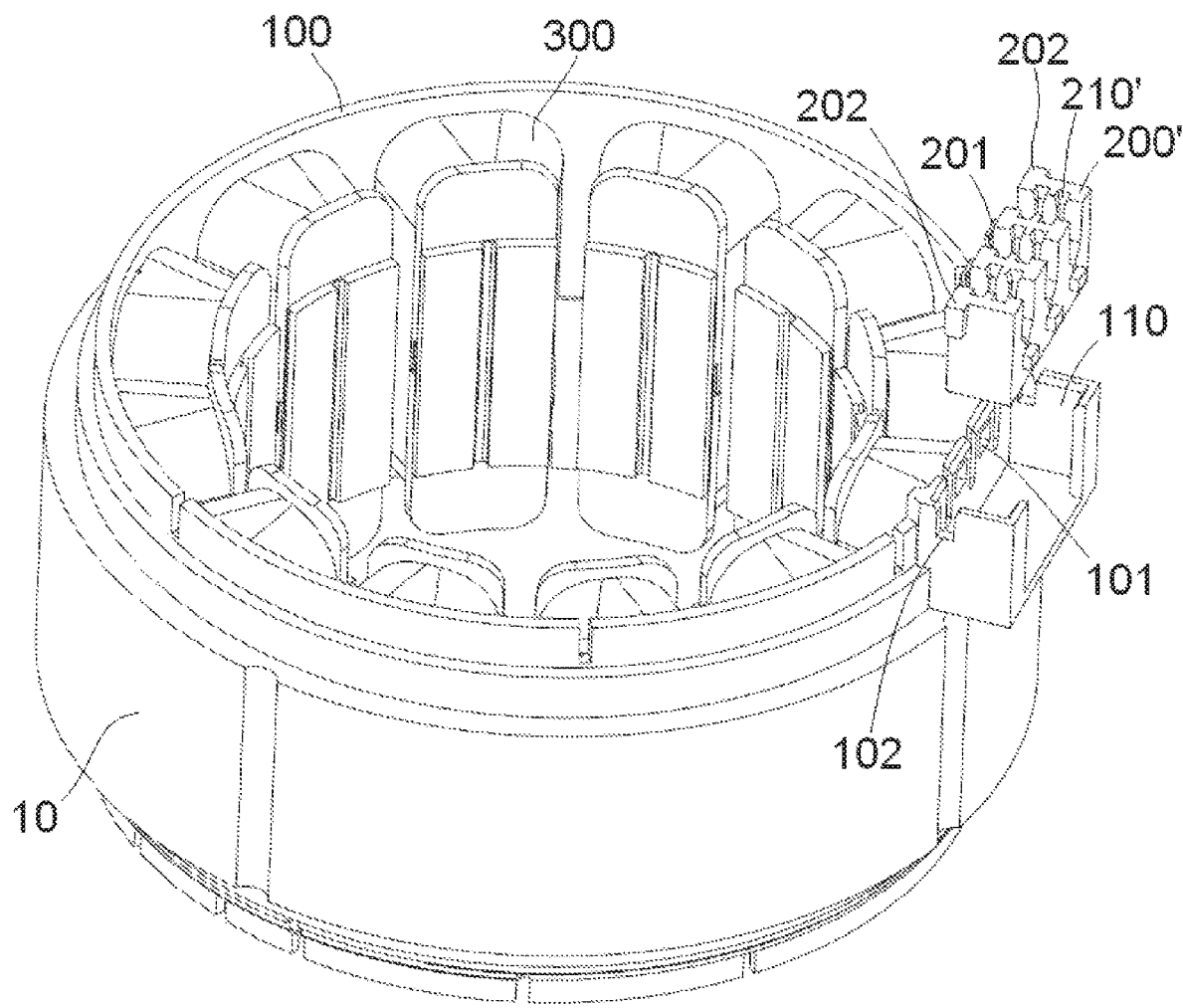
FIG. 4 is a perspective view of a stator frame according to another embodiment with the stator and the coil.
Figure 5:
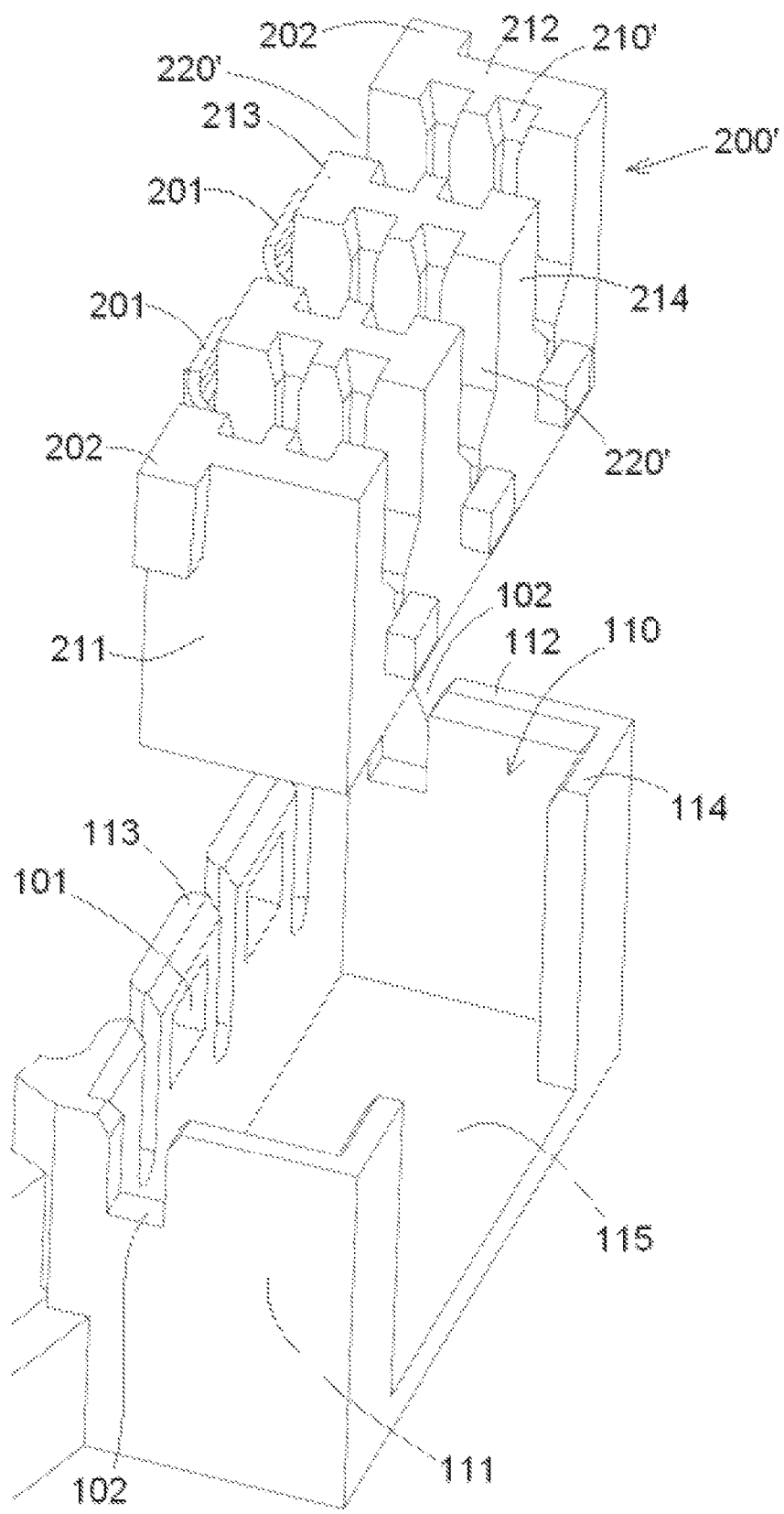
FIG. 5 is a perspective view of the stator frame of FIG. 4 with a terminal frame of the stator frame not mounted to a coil frame of the stator frame.
Figure 6:
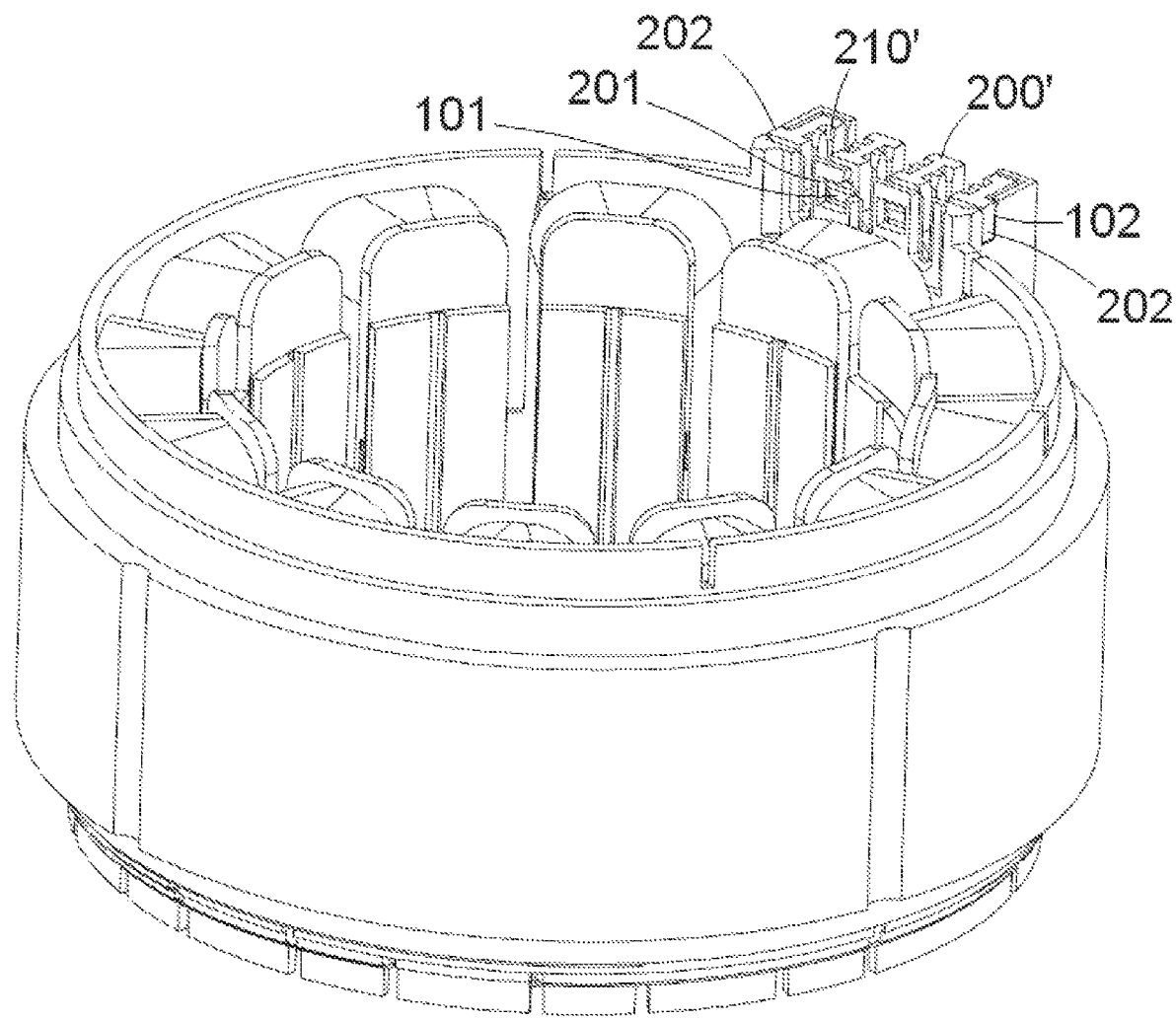
FIG. 6 is a perspective view of the stator frame of FIG. 4, the stator, and the coil with the terminal frame mounted in the coil frame.

The installation chamber 110 of the coil frame 100 is adapted to receive different types of terminal frames 200, 200' therein. For example, FIGS. 4-6 shows another type of terminal frame 200', which is different from the terminal frame 200 of FIGS. 1-3, mounted in the installation chamber 110 of the coil frame 100.

In the shown exemplary embodiment, the terminal frame 200 shown in FIGS. 1-3 is a MAGMATE type of terminal frame adapted to receive a MAGMATE type of terminal. The terminal frame 200' shown in FIGS. 4-6 is a SIAMEZE type of terminal frame adapted to receive a SIAMEZE type of terminal. The terminal chamber 210 of the terminal frame 200 is different from the terminal chamber 210' of the terminal frame 200' in shape or size. The wire slot 220 of the terminal frame 200 is different from the wire slot 220' of the terminal frame 200' in shape or size.

In the stator frame of the embodiments shown in FIGS. 1-6, the terminal frame 200, 200' is an independent component separated from the coil frame 100. Thereby, when different types of terminals or different types of wires must be replaced, or when the terminal frame 200, 200' is damaged during pressing wires or terminals into the terminal frame 200, 200', only the terminal frame 200, 200' must be replaced and it is unnecessary to replace the whole stator frame, thus saving cost.

What is claimed is:

1. A terminal frame of a stator frame, comprising:
a body formed from an electrically insulating material and adapted to receive a terminal and to be mounted to a coil frame of the stator frame in a detachable manner, the body including:
a plurality of elastic latches formed on an inner side wall of the body and adapted to engage with a corresponding slot formed in the coil frame for detachably locking to the coil frame,
a plurality of terminal chambers; and
wherein each of the plurality of elastic latches is arranged between a pair of a plurality of wire slots formed in the inner side wall.

2. The terminal frame of claim 1, wherein the body is adapted to be installed and locked in the coil frame in a snap-fitting manner.

3. The terminal frame of claim 2, wherein the body includes a pair of end walls.

4. The terminal frame of claim 3, wherein each of the pair of end walls has a wedge positioning block.

5. The terminal frame of claim 4, wherein the wedge positioning block is adapted to be fit in a wedge positioning slot formed in the coil frame to guide the terminal frame to be correctly inserted into an installation chamber formed on the coil frame.

6. The terminal frame of claim 1, wherein the plurality of wire slots are formed in the inner side wall and an outer side wall of the terminal frame.

7. A stator frame, comprising:
a coil frame on which a coil is adapted to be wound, the coil frame including:
a pair of end walls and inner and outer side walls defining an installation chamber; and
an opening formed through the outer side wall; and
a terminal frame separate from the coil frame and adapted to receive a terminal and to be installed in the installation chamber, the terminal frame including:
a pair of end walls, an inner side wall, and an outer side wall;
an elastic latch formed on the inner side wall of the terminal frame for locking the terminal frame in the installation chamber in a snap-fitting, detachable manner;
a plurality of terminal chambers;
a plurality of wire slots formed in the inner side wall and the outer side wall of the terminal frame; and
a plurality of protrusions extending in a first direction from a side of the outer side wall of the terminal frame opposite the terminal chambers, each of the protrusions aligned with one of the plurality of wire slots formed on the outer side wall of the terminal frame and received within the opening formed through the outer side wall of the coil frame when the terminal frame is installed within the installation chamber.

8. The stator frame of claim 7, wherein a slot is formed in the inner side wall of the installation chamber.

9. The stator frame of claim 8, wherein the adapted to be locked into the slot of the installation chamber to lock the terminal frame to the coil frame.

10. The stator frame of claim 9, wherein each of the pair of end walls of the installation chamber has a wedge positioning slot and each of the pair of end walls of the terminal frame has a wedge positioning block, the wedge positioning block is adapted to be fit in the wedge positioning slot to guide the terminal frame to be correctly inserted into the installation chamber.

11. The stator frame of claim 10, wherein a plurality of lead ends of a plurality of coils wound on the coil frame are adapted to be pressed into and positioned in the wire slots.

12. The stator frame of claim 11, wherein the installation chamber of the coil frame is adapted to receive different types of terminal frames therein.

13. The stator frame of claim 12, wherein the terminal chambers of the different types of terminal frames are different from each other in shape or size.

14. The stator frame of claim 12, wherein the wire slots of the different types of terminal frames are different from each other in shape or size.

15. The terminal frame of claim 6, wherein the outer side wall of the terminal frame comprises a plurality of protrusions extending in a first direction from a side of the outer side wall opposite the terminal chambers, each of the protrusions aligned with one of the plurality of wire slots formed on the outer side wall of the terminal frame.

16. The terminal frame of claim 15, wherein each of the protrusions define a slot extending in the first direction and aligned with one of the plurality of wire slots formed on the outer side wall of the terminal frame.

* * * * *